US 11,101,716 B2

(12) United States Patent
Matsuto et al.

(10) Patent No.: US 11,101,716 B2
(45) Date of Patent: Aug. 24, 2021

(54) ELECTRIC ACTUATOR

(71) Applicant: NTN CORPORATION, Osaka (JP)

(72) Inventors: Takushi Matsuto, Shizuoka (JP);
Yoshinori Ikeda, Shizuoka (JP); Yuuki
Naitou, Shizuoka (JP)

(73) Assignee: NTN CORPORATION, Osaka (JP)

( * ) Notice: Subject to any disclaimer, the term of this
patent is extended or adjusted under 35
U.S.C. 154(b) by 530 days.

(21) Appl. No.: 16/073,916

(22) PCT Filed: Jan. 26, 2017

(86) PCT No.: PCT/JP2017/002816
§ 371 (c)(1),
(2) Date: Jul. 30, 2018

(87) PCT Pub. No.: WO2017/141659
PCT Pub. Date: Aug. 24, 2017

(65) Prior Publication Data
US 2019/0044409 A1 Feb. 7, 2019

(30) Foreign Application Priority Data

Feb. 18, 2016 (JP) .............................. JP2016-028804

(51) Int. Cl.
H02K 7/06 (2006.01)
H02K 7/08 (2006.01)
(Continued)

(52) U.S. Cl.
CPC ............. H02K 7/06 (2013.01); F16C 19/06
(2013.01); F16C 19/30 (2013.01); F16C 19/32
(2013.01);
(Continued)

(58) Field of Classification Search
CPC .......... H02K 7/06; H02K 7/08; H02K 5/1735;
H02K 5/225; H02K 7/085; H02K 7/116;
(Continued)

(56) References Cited

U.S. PATENT DOCUMENTS 3,659,683 A * 5/1972 Betzing ................... B60T 13/02
188/162
6,889,800 B2 * 5/2005 Halasy-Wimmer ..... F16D 65/18
188/162

(Continued)

FOREIGN PATENT DOCUMENTS

DE         19 21 252       11/1970
DE    10 2014 212 413      12/2015
(Continued)

OTHER PUBLICATIONS

International Search Report dated Apr. 4, 2017 in International
(PCT) Application No. PCT/JP2017/002816.
(Continued)

Primary Examiner — John K Kim
(74) Attorney, Agent, or Firm — Wenderoth, Lind &
Ponack, L.L.P.

(57) ABSTRACT

Provided is an electric actuator (1), including: a motor part
(A); and a motion conversion mechanism part (B). The
motion conversion mechanism part (B) includes: a ball
screw shaft (33); and a ball screw nut (32), which is rotatably
fitted to an outer periphery of the ball screw shaft (33), and
is provided so as to be capable of transmitting torque with
a rotor (24) of the motor part (A) rotatably supported
through intermediation of a rolling bearing (27, 30). The ball
screw shaft (33) advances toward one side in the axial
direction or retreats toward another side in the axial direc-
tion in accordance with a rotation direction of the ball screw
nut (32). In the electric actuator (1), a needle roller bearing
(Continued)

(47) serving as a thrust bearing is arranged adjacent to the ball screw nut (32) on the another side in the axial direction.

9 Claims, 12 Drawing Sheets

(51) Int. Cl.
*H02K 5/173* (2006.01)
*H02K 5/22* (2006.01)
*H02K 7/116* (2006.01)
*H02K 21/22* (2006.01)
*F16C 19/30* (2006.01)
*F16C 19/32* (2006.01)
*F16C 19/06* (2006.01)
*F16C 33/58* (2006.01)
*F16C 19/54* (2006.01)
*F16H 13/08* (2006.01)
*F16H 25/22* (2006.01)
*F16H 25/20* (2006.01)

(52) U.S. Cl.
CPC .......... *F16C 19/545* (2013.01); *F16C 33/581* (2013.01); *F16H 13/08* (2013.01); *F16H 25/2204* (2013.01); *H02K 5/1735* (2013.01); *H02K 5/225* (2013.01); *H02K 7/08* (2013.01); *H02K 7/085* (2013.01); *H02K 7/116* (2013.01); *H02K 21/22* (2013.01); *F16C 2380/26* (2013.01); *F16H 25/2015* (2013.01); *F16H 2025/2068* (2013.01); *F16H 2025/2075* (2013.01); *F16H 2025/2078* (2013.01); *F16H 2025/2087* (2013.01); *H02K 2205/03* (2013.01)

(58) Field of Classification Search
CPC .... H02K 21/22; H02K 2205/03; F16C 19/32; F16C 19/06; F16C 33/581; F16C 19/545; F16C 19/30; F16C 2380/26; F16H 13/08; F16H 25/2204; F16H 2025/2068; F16H 2025/2075; F16H 25/2015; F16H 2025/2078; F16H 2025/2087
USPC ................................................ 310/71, 80, 90
See application file for complete search history.

(56) References Cited

U.S. PATENT DOCUMENTS

| | | | | |
|---|---|---|---|---|
| 8,277,349 | B2* | 10/2012 | Erhart | F16H 3/72 475/2 |
| 9,586,564 | B2* | 3/2017 | Weh | B60T 8/4018 |
| 9,765,867 | B2* | 9/2017 | Hirai | F16H 25/2454 |
| 10,731,739 | B2* | 8/2020 | Matsuto | F16H 25/2204 |
| 10,830,320 | B2* | 11/2020 | Matsuto | H02K 7/116 |
| 10,865,861 | B2* | 12/2020 | Matsuto | F16H 25/24 |
| 2006/0169548 | A1 | 8/2006 | Corbett et al. | |
| 2015/0375727 | A1* | 12/2015 | Weh | B60T 8/4022 60/594 |
| 2019/0044409 | A1* | 2/2019 | Matsuto | F16C 19/06 |

FOREIGN PATENT DOCUMENTS

| | | |
|---|---|---|
| JP | 2003-247576 | 9/2003 |
| JP | 2005-170064 | 6/2005 |
| JP | 2006-9913 | 1/2006 |
| JP | 2014-018007 | 1/2014 |

OTHER PUBLICATIONS

Extended European Search Report dated Sep. 16, 2019 in corresponding European Patent Application No. 17752922.9.
International Preliminary Report on Patentability and Written Opinion of the International Searching Authority dated Aug. 21, 2018 in International (PCT) Patent Application No. PCT/JP2017/002816.

\* cited by examiner

ELECTRIC ACTUATOR

TECHNICAL FIELD

The present invention relates to an electric actuator.

BACKGROUND ART

In recent years, electrification of automobiles have been promoted for power saving and reduction in fuel consumption. For example, a system for operating an automatic transmission, a brake, and a steering wheel of an automobile with use of power of an electric motor (motor) has been developed and brought to the market. As an electric actuator for use in such a system, there has been known an electric actuator employing a ball screw device as a motion conversion mechanism configured to convert a rotary motion of a motor into a linear motion to output the motion (for example, see Patent Literature 1). In this case, a ball screw shaft being a part of the ball screw device serves as an output member of the electric actuator.

CITATION LIST

Patent Literature 1: JP 2014-18007 A

SUMMARY OF INVENTION

Technical Problem

In the electric actuator described in Patent Literature 1, a portion corresponding to a ball screw nut (hereinafter referred to as "nut portion") of the ball screw device is integrally provided to a rotor of the motor. The rotor is rotatably supported by a rolling bearing and a slide bearing which are arranged at end portions of the rotor on one side (advancing side of the ball screw shaft) and another side (retreating side of the ball screw shaft) in an axial direction of the rotor, and both a radial load and a thrust load of the rotor is supported by the rolling bearing.

However, when such a load support structure described above is employed, a reaction force (thrust load) which acts on the nut portion of the rotor along with the linear motion (advance) of the ball screw shaft toward the one side in the axial direction is substantially supported by the above-mentioned rolling bearing which is arranged apart from the nut portion of the rotor in the axial direction and in a radial direction. Therefore, there is a fear in that a relatively large moment load acts on the ball screw shaft or the rotor due to misalignment or the like caused by inclination of the nut portion or error in assembly accuracy which may occur at the time of receiving the reaction force. When such moment load repeatedly acts on the ball screw shaft or the rotor, there is a risk of causing an adverse influence on an operation accuracy as well as a durability life of the ball screw shaft or the rotor.

In view of the actual circumstances described above, it is an object of the present invention to suppress as much as possible a moment load which acts on a ball screw shaft or a rotor of a motor part, to thereby achieve a highly reliable electric actuator with excellent operation accuracy and durability life.

Solution to Problem

In order to solve the above-mentioned problem, according to one embodiment of the present invention, there is provided an electric actuator, comprising: and a motor part configured to drive upon receiving supply of power; a motion conversion mechanism part configured to convert a rotary motion of the motor part into a linear motion to output the motion, wherein the motion conversion mechanism part comprises: a ball screw shaft arranged coaxially with a rotation center of the motor part; and a ball screw nut, which is rotatably fitted to an outer periphery of the ball screw shaft through intermediation of a plurality of balls, and is provided so as to be capable of transmitting torque with a rotor of the motor part rotatably supported through intermediation of a rolling bearing, wherein the ball screw shaft advances toward one side in the axial direction or retreats toward another side in the axial direction in accordance with a rotation direction of the ball screw nut, and wherein a thrust bearing is arranged adjacent to the ball screw nut on the another side in the axial direction.

With such a configuration, the thrust load which acts on the ball screw nut along with the advance of the ball screw shaft can be directly supported by the thrust bearing arranged adjacent to another side of the ball screw nut in the axial direction. With this, the moment load which acts on the ball screw device (motion conversion mechanism part) including the components such as the ball screw shaft and the ball screw nut as well as on the rotor of the motor part can be effectively suppressed. Therefore, a highly reliable electric actuator with excellent operation accuracy and durability life can be achieved.

In the configuration described above, two rolling bearings configured to support the rotor of the motor part can be arranged at two locations apart from each other in the axial direction, and the thrust bearing can be arranged within a range in the axial direction between the two rolling bearings. With such a configuration, the moment load which acts on the ball screw shaft and the like can be suppressed more effectively, and the thrust bearing can be reduced in size.

When a needle roller bearing is employed as the thrust bearing, a large thrust load can be supported while being reduced in size in the axial direction.

In the configuration described above, the rotor of the motor part can comprise: a rotor core which holds a rotor magnet; and a hollow rotary shaft, which has the rotor core mounted to an outer periphery thereof, and has the ball screw nut arranged on an inner periphery thereof. In this case, an inner raceway surface of one of the two rolling bearings arranged apart from each other in the axial direction can be formed on the hollow rotary shaft. When such a configuration is employed, the hollow rotary shaft as well as the rotor can be reduced in size in the axial direction, thereby being capable of achieving an electric actuator which is reduced in size in the axial direction and has excellent mountability with respect to a device to be used.

When the inner raceway surface described above is formed on the hollow rotary shaft, the inner raceway surface can be arranged within an axial width of the ball screw nut. With this configuration, the electric actuator can be further reduced in size in the axial direction.

An urging member configured to always urge the ball screw shaft toward another side in the axial direction can also be provided. With such a configuration, for example, when the drive power is not properly supplied to the motor part, the ball screw shaft is automatically returned to an original point, thereby being capable of reducing as much as possible the possibility of causing an adverse influence on the operation of the object to be operated.

The motion conversion mechanism part may further comprise a speed reducer configured to reduce a speed of rotation of the rotor and transmit the rotation to the ball screw nut. In this case, a small motor can be employed. Thus, there can be achieved the electric actuator which is reduced in weight and size and has excellent mountability with respect to a device to be used. As the speed reducer, a planetary gear speed reducer can be employed. With the planetary gear speed reducer, a speed reduction ratio can easily be adjusted by, for example, changing a gear specification or changing the number of stages of the installed planetary gears. Further, there is also an advantage in that, even when the planetary gears are installed with a large number of stages, an increase in size of the speed reducer and the electric actuator can be avoided.

The electric actuator having the above configuration may further comprise: a housing, which comprises a plurality of members being coupled to one another in the axial direction, and is configured to accommodate the motor part and the motion conversion mechanism part; and a terminal part which is configured to hold a power supply circuit, the power supply circuit being configured to supply the power to the motor part. In this case, the terminal part may be sandwiched by the members forming the housing from both sides in the axial direction. Thus, ease of assembly of the electric actuator can be improved.

The terminal part may have, on an outer peripheral portion thereof, an opening portion for allowing a lead wire connected to the power supply circuit to be drawn out to a radially outer side of the housing. With such a configuration, for example, an electric actuator comprising a plurality of electric actuators connected in series and respectively having a ball screw shaft, and being capable of causing respective ball screw shafts to individually perform a linear motion can easily be achieved. Such an electric actuator can be mounted to a device to be used with two or more objects to be operated, for example, can be mounted to a dual clutch transmission (DCT) being one type of automatic transmissions, thereby being capable contributing to simplification and reduction in weight and size of a device as a whole, including the electric actuator.

Advantageous Effects of Invention

As described above, according to the present invention, an electric actuator with high versatility being applicable to various devices can be provided, thereby being capable of achieving reduction in cost and production in series of the electric actuator.

DESCRIPTION OF EMBODIMENTS

Now, description is made of an embodiment of the present invention with reference to the drawings.

Figure 1:
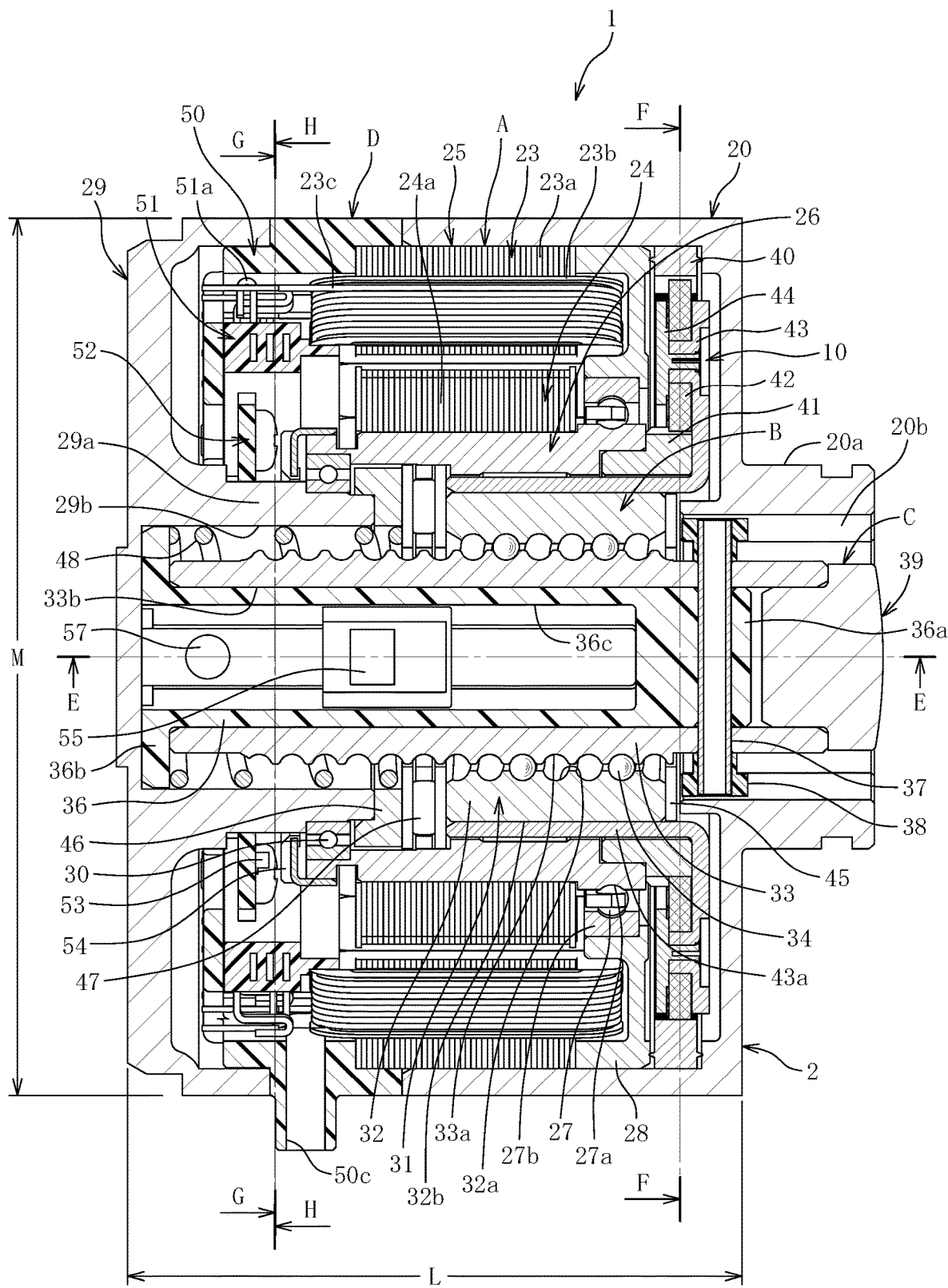
FIG. 1 is a vertical sectional view of an electric actuator according to one embodiment of the present invention.
Figure 2:
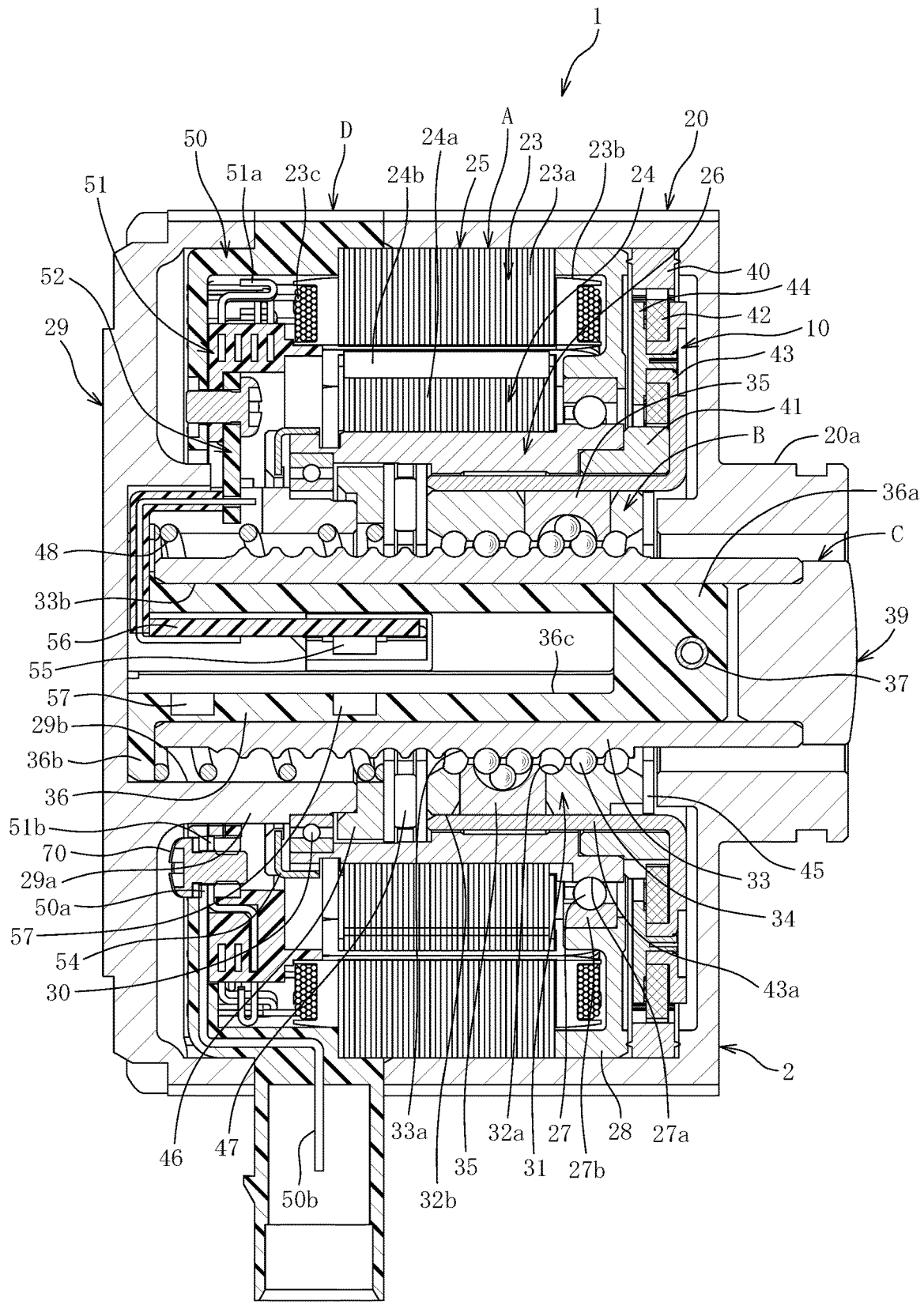
FIG. 2 is a sectional view as seen from a direction indicated by the arrows of the line E-E in FIG. 1.
Figure 3:
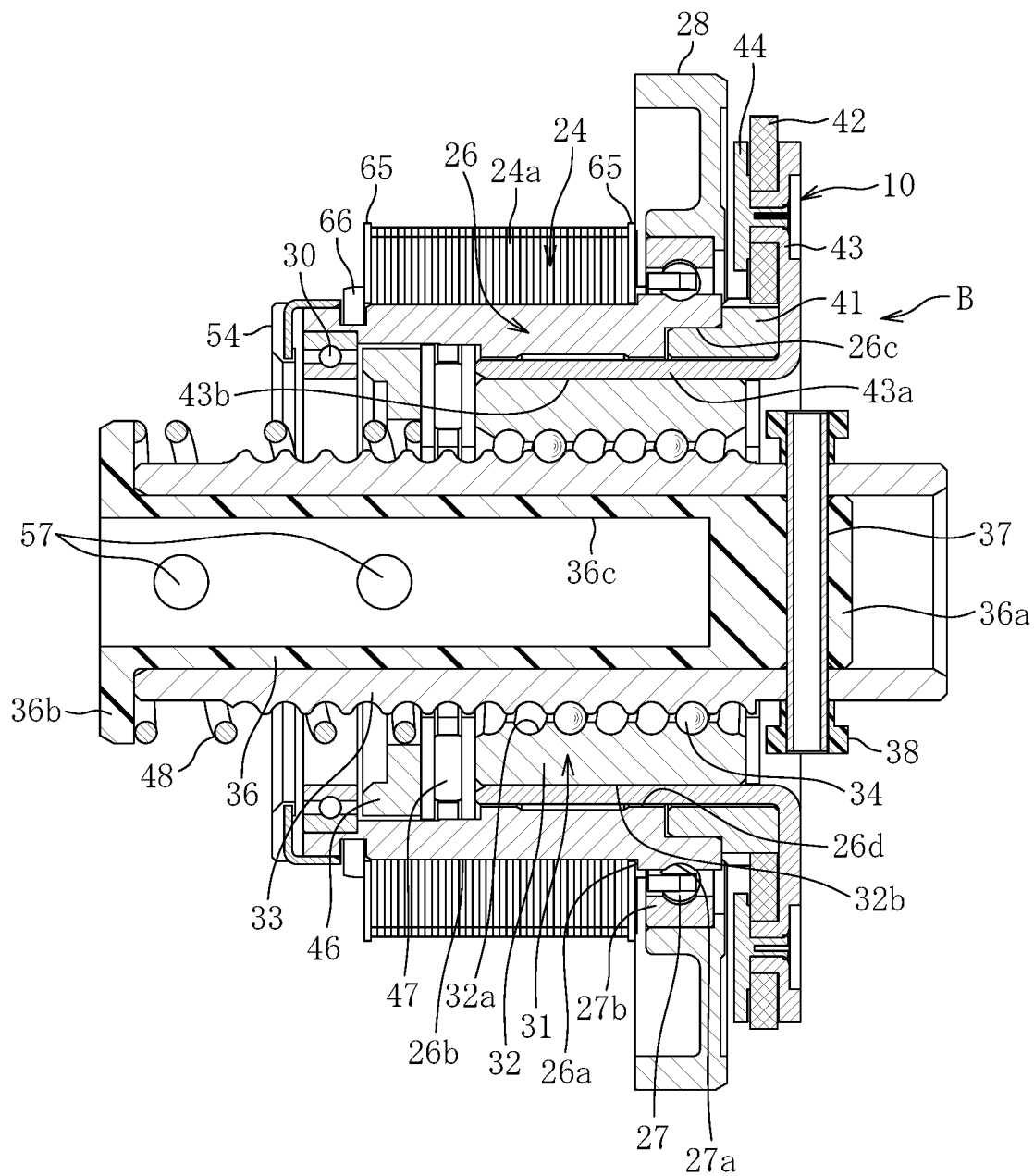
FIG. 3 is an enlarged vertical sectional view for illustrating a rotor of a motor and a motion conversion mechanism part.

FIG. 1 is a vertical sectional view of an electric actuator according to one embodiment of the present invention. FIG. 2 is a sectional view as seen from a direction indicated by the arrows of the line E-E in FIG. 1. FIG. 3 is an enlarged vertical sectional view for illustrating a rotor of a motor and a motion conversion mechanism part. FIG. 1 and FIG. 2 are illustrations of a state in which a ball screw shaft of a ball screw device which forms an output member of the electric actuator is located at an original point. The state of being located at the original point corresponds to a position at which a cover 29 and a spring mounting collar 36 are mechanically held in abutment against each other by a spring force of a compression coil spring 48 being an urging member described later. As illustrated in FIG. 1 and FIG. 2, the electric actuator 1 comprises a motor part A, a motion conversion mechanism part B, an operation part C, and a terminal part D, which are accommodated and held in a housing 2. The motor part A is driven upon receiving supply of power. The motion conversion mechanism part B is configured to convert a rotary motion of the motor part A into a linear motion and output the linear motion. The operation part C is configured to operate an object to be operated (not shown).

The housing 2 comprises a plurality of members being coupled to one another in the axial direction in a state of being coaxially arranged. The housing 2 in this embodiment is formed of a coupled body comprising a tubular casing 20, a cover 29, and a terminal main body 50. The casing 20 has an end portion on one side in the axial direction (right side of the drawing sheet in FIG. 1 and FIG. 2, which similarly applies to the following description) and an end portion on another side in the axial direction (left side of the drawing sheet in FIG. 1 and FIG. 2, which similarly applies to the following description), which are opened. The cover 29 is configured to close an opening in the end portion of the casing 20 on the another side in the axial direction. The terminal main body 50 is arranged between the casing 20 and the cover 29, and forms the terminal part D. The cover 29 and the terminal main body 50 are mounted and fixed to the casing 20 by assembly bolts 61 illustrated in FIG. 9 and FIG. 10.

The motor part A is formed of a motor 25 of a radial gap type (specifically, a three-phase brushless motor having a U-phase, a V-phase, and a W-phase) comprising a stator 23 fixed to the casing 20 and a rotor 24 arranged so as to be opposed to an inner periphery of the stator 23 through a radial gap. The stator 23 comprises a bobbin 23b and a coil 23c. The bobbin 23b for insulation is mounted to the stator core 23a. The coil 23c is wound around the bobbin 23b. The rotor 24 comprises a rotor core 24a, a permanent magnet 24b being a rotor magnet mounted to an outer periphery of the rotor core 24a, and a hollow shaft-shaped rotor inner 26 being a hollow rotation shaft having the rotor core 24*a* mounted to an outer periphery thereof.

As illustrated in FIG. 3, after a side plate 65 is set on a shoulder portion 26*a* of the rotor inner 26 on the one side in the axial direction, the rotor core 24*a* is fitted to an outer peripheral surface 26*b* of the rotor inner 26. After the permanent magnet 24*b* is fitted to an outer periphery of the rotor core 24*a*, the permanent magnet 24*b* (see FIG. 2) is positioned and fixed by a side plate 65, which is mounted to the rotor inner 26 on an outer side in the axial direction of the end portion of the rotor core 24*a* on the another side in the axial direction, and a circlip 66 mounted on an outer side of the side plate 65 in the axial direction.

As illustrated in FIG. 1 to FIG. 3, on an outer periphery of the end portion of the rotor inner 26 on the one side in the axial direction, an inner raceway surface 27*a* of the rolling bearing 27 is formed. An outer ring 27*b* of the rolling bearing 27 is mounted to an inner peripheral surface of a bearing holder 28 fixed to an inner peripheral surface of the casing 20. Moreover, a rolling bearing 30 is mounted between an inner peripheral surface of the end portion of the rotor inner 26 on the another side in the axial direction and an outer peripheral surface of a cylindrical portion 29*a* of the cover 29. With such a configuration, the rotor inner 26 is supported so as to be rotatable with respect to the housing 2 through the rolling bearings 27 and 30.

As illustrated in FIG. 1 to FIG. 3, the motion conversion mechanism part B in this embodiment comprises a ball screw device 31 and a planetary gear speed reducer 10 as a speed reducer.

The ball screw device 31 comprises a ball screw shaft 33, a ball screw nut 32, and deflectors 35. The ball screw shaft 33 is arranged coaxially with the rotor 24 (rotor inner 26), and serves as an output member of the electric actuator 1. The ball screw nut 32 is rotatably fitted to an outer periphery of the ball screw shaft 33 through intermediation of a plurality of balls 34, and is arranged on an inner periphery of the rotor inner 26 so as to be capable of transmitting torque with the rotor inner 26. The deflectors 35 serve as circulation members. Between a spiral groove 32*a* formed in an inner peripheral surface of the ball screw nut 32 and a spiral groove 33*a* formed in an outer peripheral surface of the ball screw shaft 33, the plurality of balls 34 are loaded, and the deflectors 35 are incorporated. With such a configuration, when the ball screw shaft 33 performs a linear motion in the axial direction along with the rotation of the ball screw nut 32, the balls 34 circulate between the spiral grooves 32*a* and 33*a*.

The ball screw shaft 33 is a hollow shaft with a hole portion (in this embodiment, a through hole which is opened in end surfaces on both sides in the axial direction) 33*b* extending in the axial direction, and the spring mounting collar 36 is received in the hole portion 33*b*. The spring mounting collar 36 is made of a resin material such as PPS, and integrally comprises a circular solid portion 36*a*, a flange-shaped spring receiving portion 36*b*, and a cylinder portion 36*c*. The circular solid portion 36*a* is formed at an end portion of the spring mounting collar 36 on the one side in the axial direction. The spring receiving portion 36*b* is formed at an end portion of the spring mounting collar 36 on the another side in the axial direction. The cylinder portion 36*c* connects the circular solid portion 36*a* and the spring receiving portion 36*b* to each other.

The spring mounting collar 36 received in the hole portion 33*b* of the ball screw shaft 33 is coupled and fixed to the ball screw shaft 33 by fitting a pin 37 so as to penetrate through the circular solid portion 36*a* and the ball screw shaft 33 in a radial direction. Both end portions of the pin 37 project radially outward from the outer peripheral surface of the ball screw shaft 33, and guide collars 38 are externally fitted to the projecting portions so as to be rotatable. The guide collars 38 are made of a resin material such as PPS, and are fitted to guide grooves 20*b* (also see FIG. 5). The guide grooves 20*b* are formed in an inner periphery of a small-diameter cylindrical portion 20*a* of the casing 20 and extend in the axial direction. With such a configuration, when the ball screw nut 32 rotates about an axis of the ball screw shaft 33 along with rotation of the rotor 24, the ball screw shaft 33 performs a linear motion in the axial direction while being stopped in rotation. The ball screw shaft 33 performs a linear motion (advances) from another side in the axial direction toward one side in the axial direction or performs a linear motion (retreats) from the one side in the axial direction toward the another side in the axial direction basically in accordance with a rotation direction of the rotor 24 (ball screw nut 32). In this embodiment, the ball screw shaft 33 is retreatable also by a spring force of the compression coil spring 28 serving as the urging member (details are described later).

As illustrated in FIG. 1 and FIG. 2, an actuator head 39 serving as the operation part C is removably mounted to an end portion of the ball screw shaft 33 on the one side in the axial direction. The actuator head 39 in this embodiment is of a so-called pressing type in which a distal end surface of the ball screw shaft 33 presses an object to be operated in the axial direction along with the linear motion (advance) of the ball screw shaft 33 toward the one side in the axial direction.

As illustrated in FIG. 1 to FIG. 4, the planetary gear speed reducer 10 comprises a ring gear 40, a sun gear 41, a plurality of (four in this embodiment) planetary gears 42, a planetary gear carrier 43, and planetary gear holders 44. The ring gear 40 is fixed to the casing 20. The sun gear 41 is press-fitted and fixed to an inner peripheral surface of a step portion of the rotor inner 26. The planetary gears 42 are arranged between the ring gear 40 and the sun gear 41, and mesh with the gears 40 and 41. The planetary gear carrier 43 and the planetary gear holders 44 rotatably hold the planetary gears 42.

Figure 4:
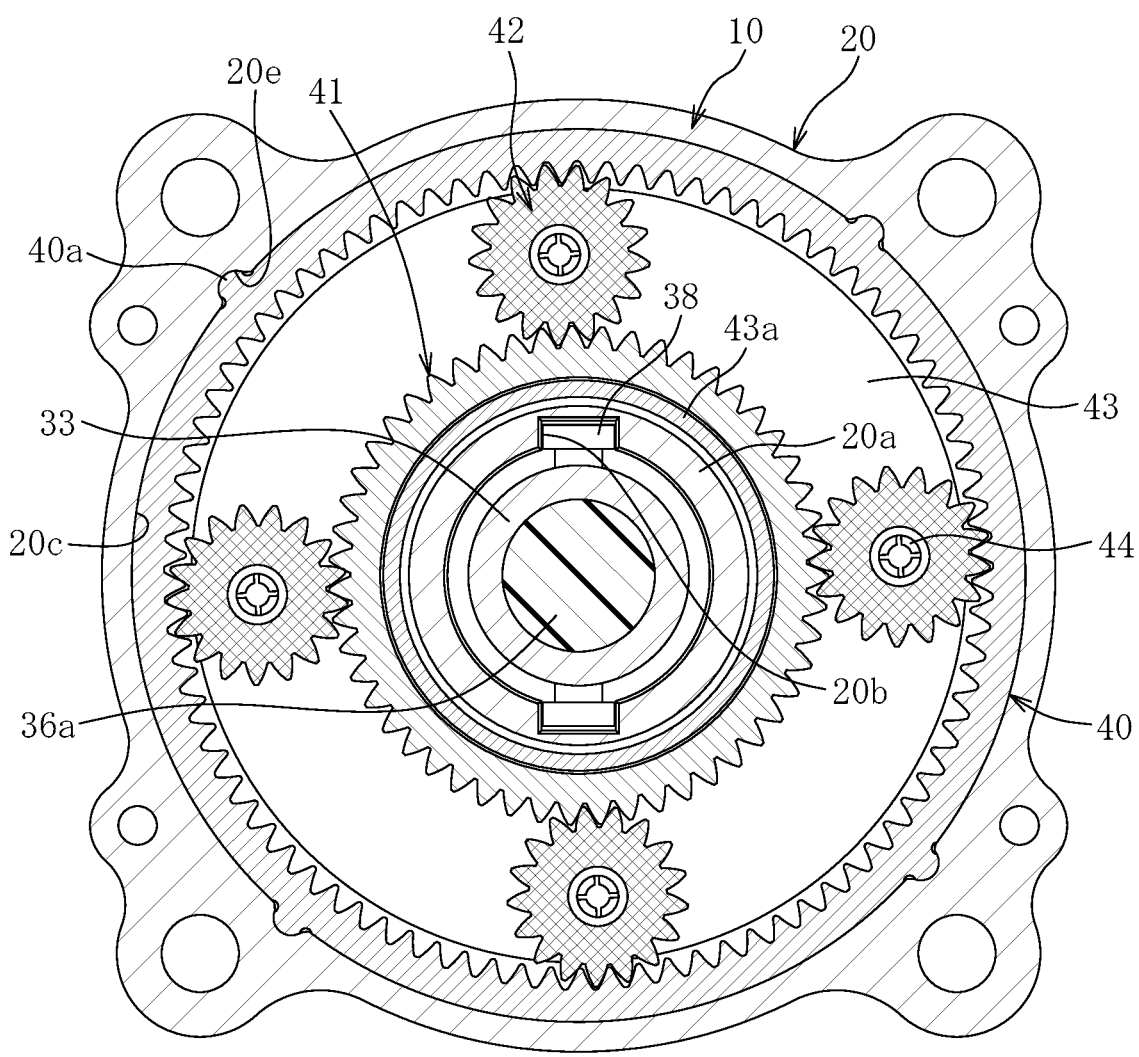
FIG. 4 is a sectional view as seen from a direction indicated by the arrows of the line F-F in FIG. 1.

As illustrated in FIG. 4, notches 40*a* which project radially outward are formed on an outer periphery of the ring gear 40 at a plurality of positions (four positions in the illustrated example) apart from one another in the circumferential direction. The notches 40*a* are fitted to axial grooves 20*e* (also see FIG. 5) formed at a plurality of positions (four positions in the illustrated example) apart from one another in the circumferential direction of an inner peripheral surface 20*c* of the casing 20. With this configuration, the ring gear 40 is stopped in rotation with respect to the casing 20.

The planetary gear carrier 43 is rotatable relative to the rotor inner 26. As illustrated in FIG. 1 to FIG. 3, the planetary gear carrier 43 integrally comprises a cylindrical portion 43*a* which is arranged between the inner peripheral surface of the rotor inner 26 and an outer peripheral surface 32*b* of the ball screw nut 32. An outer peripheral surface of the cylindrical portion 43*a* is opposed to an inner peripheral surface of the rotor inner 26 (and an inner peripheral surface of the sun gear 41) through a radial gap, and an inner peripheral surface of the cylindrical portion 43*a* is press-fitted to the outer peripheral surface 32*b* of the ball screw nut 32. With the planetary gear speed reducer 10 having the configuration described above, rotation of the rotor 24 (rotor inner 26) of the motor 25 is reduced in speed and transmitted to the ball screw nut 32. With this action, rotation torque can be increased. Thus, the motor 25 having a small size can be employed, thereby being capable of reducing the weight and size of the electric actuator 1 as a whole.

As illustrated in FIG. 1 to FIG. 3, a thrust washer 45 is provided between an end surface of the ball screw nut 32 on the one side in the axial direction and the casing 20, and a needle roller bearing 47 as a thrust bearing is provided between a thrust receiving ring 46 mounted to an outer periphery of a distal end portion of the cylindrical portion 29a of the cover 29 and an end surface of the ball screw nut 32 on the another side in the axial direction. That is, the needle roller bearing 47 is arranged adjacent to the ball screw nut 32 on the another side in the axial direction.

As illustrated in FIG. 1 and FIG. 2, the compression coil spring 48 serving as an urging member is provided between an inner peripheral surface 29b of the cylindrical portion 29a of the cover 29 and the outer peripheral surface of the ball screw shaft 33. End portions of the compression coil spring 48 on the one side and the another side in the axial direction are held in abutment against the thrust needle roller bearing 47 and the spring receiving portion 36b of the spring mounting collar 36, respectively. With a spring force of the compression coil spring 48 provided in such a manner, the ball screw shaft 33 coupled to the spring mounting collar 36 is always urged toward the original point side. With such a configuration, for example, when the drive power is not properly supplied to the motor part A (motor 25), the ball screw shaft 33 is automatically returned to an original point, thereby being capable of reducing as much as possible the risk of causing an adverse influence on the operation of the object to be operated (not shown).

Figure 9:
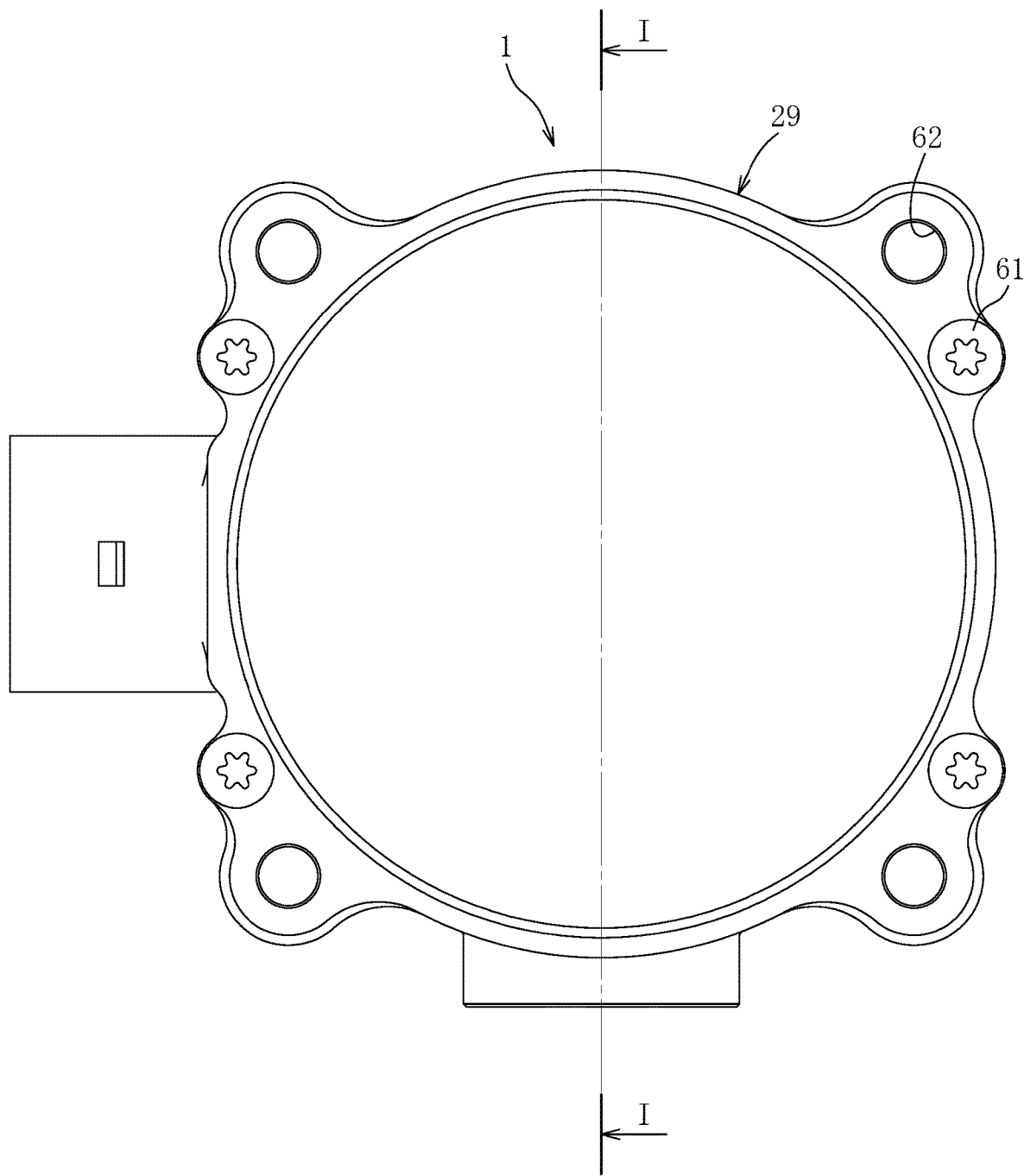
FIG. 9 is a left side view of the electric actuator illustrated in FIG. 1.
Figure 10:
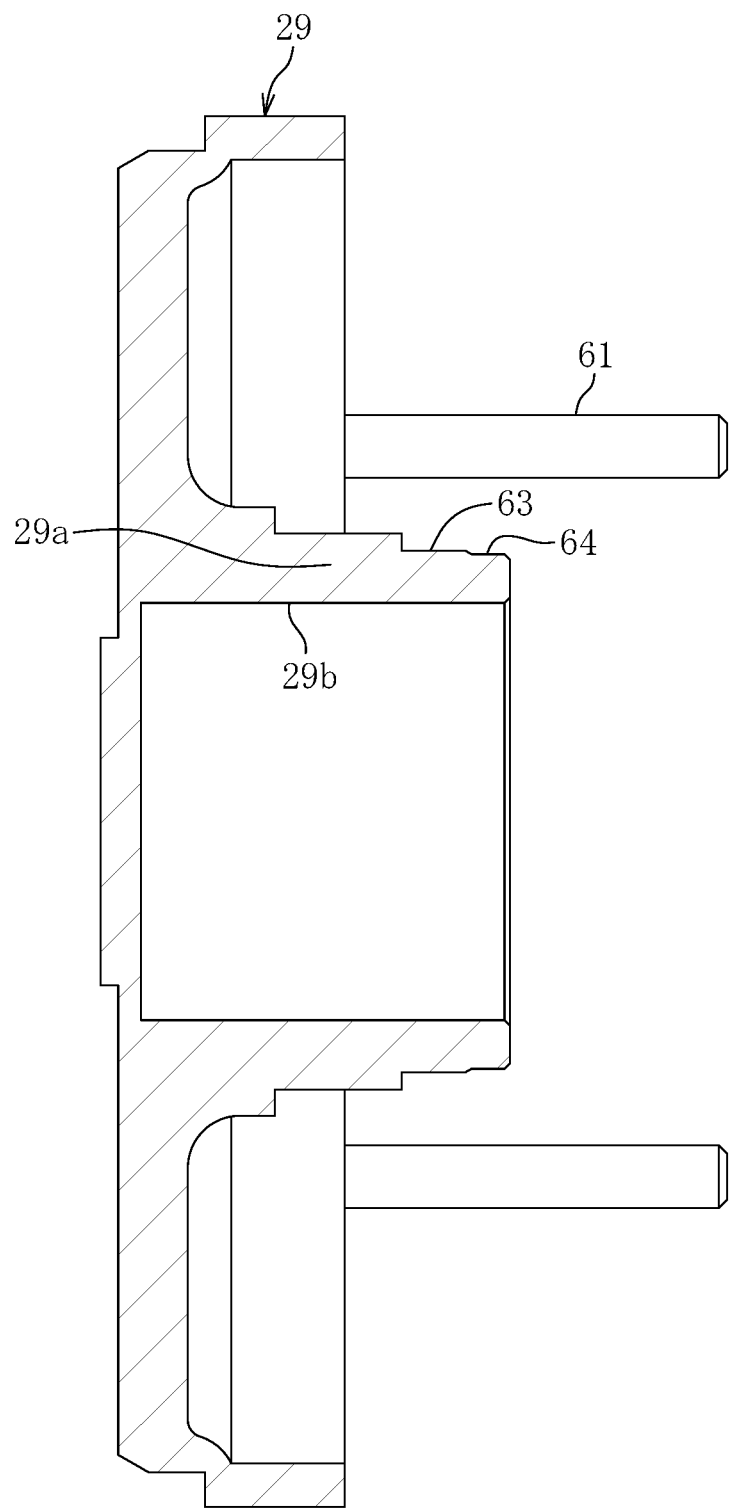
FIG. 10 is a sectional view as seen from a direction indicated by the arrows of the line I-I in FIG. 9.

Details of the cover 29 are described with reference to FIG. 9 and FIG. 10. FIG. 9 is a left side view of FIG. 1. FIG. 10 is a sectional view as seen from a direction indicated by the arrows of the line I-I in FIG. 9. The cover 29 is made of a metal material which is excellent in ease of processing (capability of mass production) and thermal conductivity, such as an aluminum alloy, a zinc alloy, or a magnesium alloy. Although illustration is omitted, cooling fins for enhancing cooling efficiency of the electric actuator 1 may be provided on an outer surface of the cover 29. As illustrated in FIG. 10, on an outer peripheral surface of the cylindrical portion 29a of the cover 29, there are formed a bearing mounting surface 63 to which the rolling bearing 30 is mounted and a fitting surface 64 to which the thrust receiving ring 46 is fitted. Moreover, as illustrated in FIG. 9, the cover 29 has through holes (not shown) into which the assembly bolts 61 of the electric actuator 1 are inserted and through holes 62 into which mounting bolts for mounting the electric actuator 1 to a device to be used are inserted.

Figure 6:
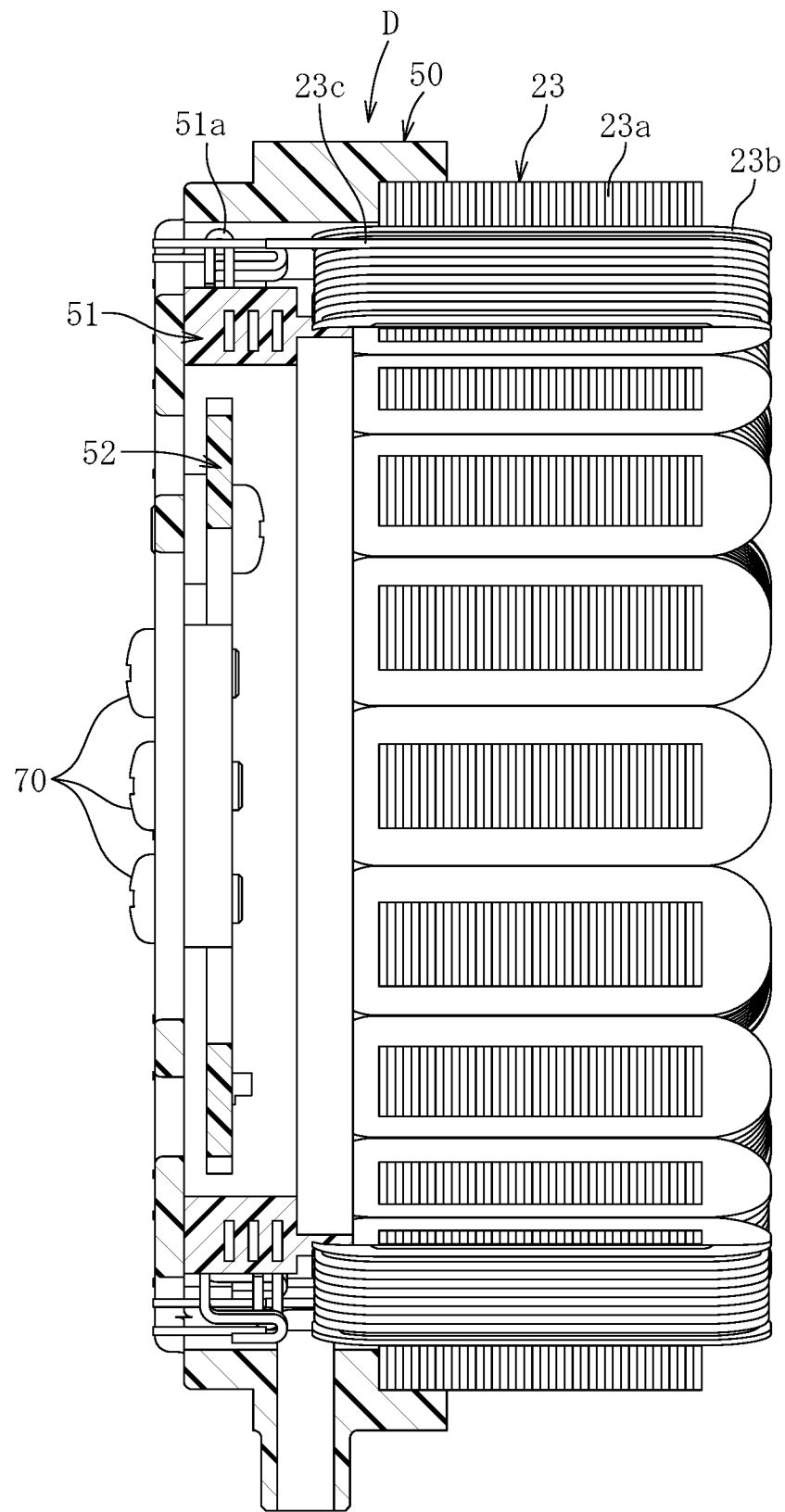
FIG. 6 is an enlarged vertical sectional view for illustrating a stator of the motor and a terminal part.
Figure 7:
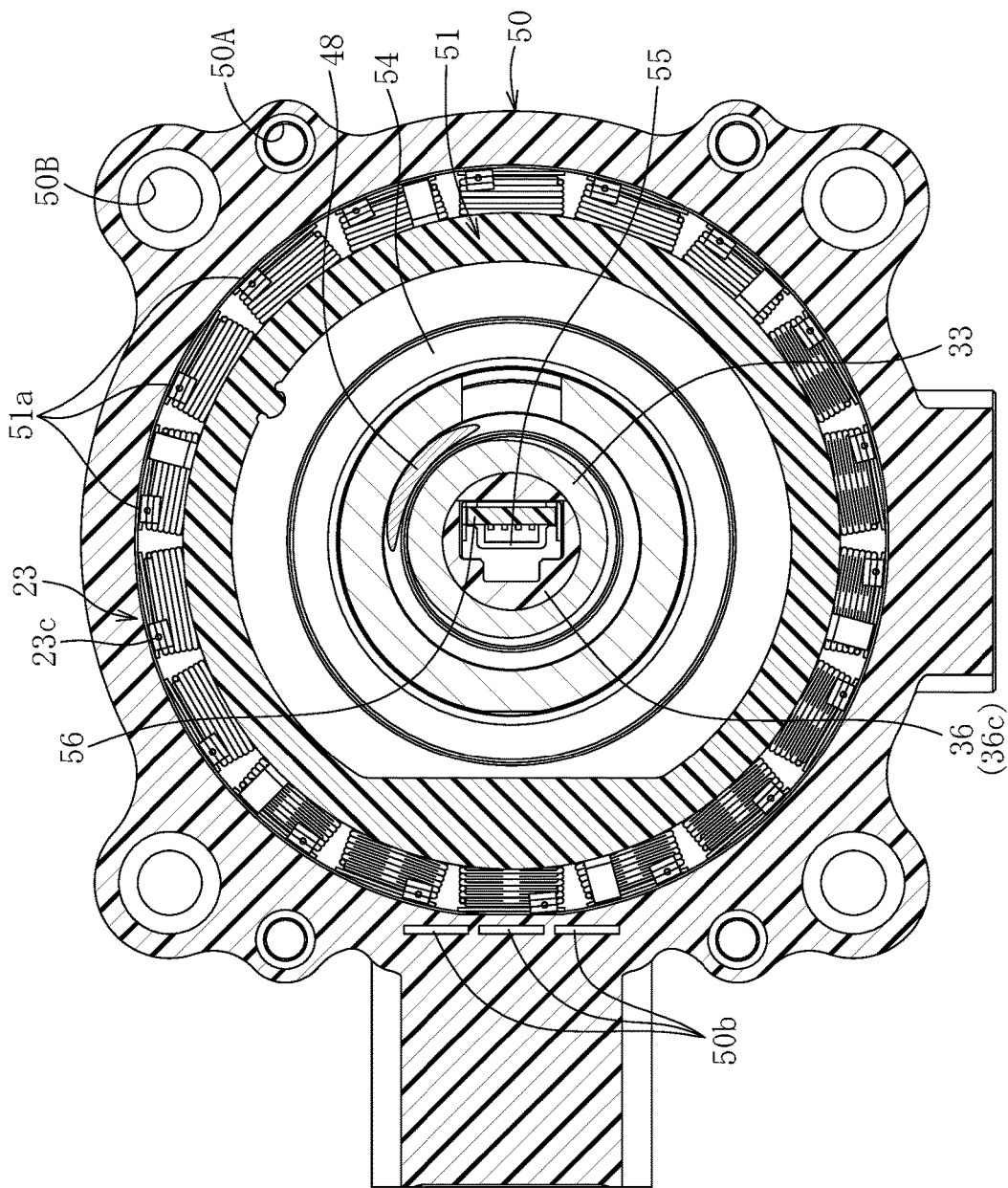
FIG. 7 is a sectional view as seen from a direction indicated by the arrows of the line G-G in FIG. 1.
Figure 8:
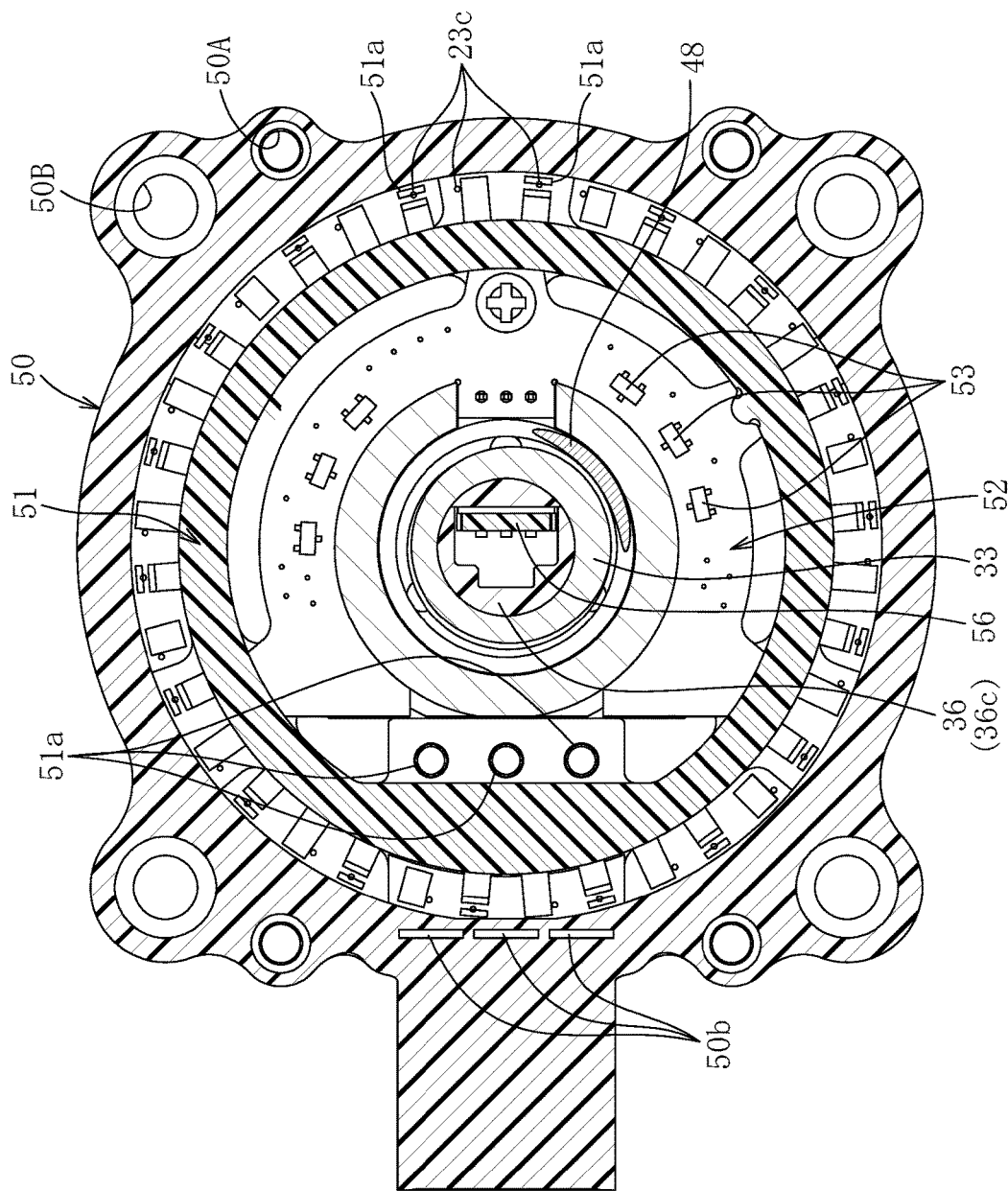
FIG. 8 is a sectional view as seen from a direction indicated by the arrows of the line H-H in FIG. 1.

Next, with reference to FIG. 1 and FIG. 6 to FIG. 8, description is made of the terminal part D. FIG. 6 is an enlarged vertical sectional view for illustrating the stator 23 of the motor 25 and the terminal part D illustrated in FIG. 1. FIG. 7 is a sectional view as seen from a direction indicated by the arrows of the line G-G in FIG. 1. FIG. 8 is a sectional view as seen from a direction indicated by the arrows of the line H-H in FIG. 1. As illustrated in FIG. 6, the terminal part D comprises a terminal main body 50, a bus bar 51, and a disc-shaped print board 52. The terminal main body 50 integrally comprises a short tubular portion and a disc-shaped portion. The short tubular portion forms a part of the housing 2. The disc-shaped portion extends radially inward from an end portion of the short tubular portion on the another side in the axial direction. The bus bar 51 and the print board 52 are fixed by screws to (the disc-shaped portion of) the terminal main body 50. As illustrated in FIG. 7 and FIG. 8, (the short tubular portion of) the terminal main body 50 has through holes 50A into which the assembly bolts 61 illustrated in FIG. 9 and FIG. 10 are inserted and through holes 50B into which bolts for mounting the electric actuator 1 to a device to be used are inserted. The terminal main body 50 is sandwiched between the casing 20 and the cover 29 by the assembly bolts 61 (see FIG. 1 and FIG. 2). The terminal main body 50 is made of a resin material such as PPS.

The terminal part D (terminal main body 50) holds a power supply circuit for supplying drive power to the motor 25. The power supply circuit is formed by connecting coils 23c of the stator 23 to terminals 51a of the bus bar 51 for respective phases of a U-phase, a V-phase, and a W-phase as illustrated in FIG. 7 and FIG. 8, and fastening a terminal 51b of the bus bar 51 and a terminal base 50a of the terminal main body 50 with each other by a screw 70 as illustrated in FIG. 2. The terminal base 50a comprises a terminal 50b to which a lead line (not shown) is connected, and the lead line is drawn out to a radially outer side of the housing 2 through an opening portion 50c (see FIG. 1) formed in an outer peripheral portion (short tubular portion) of the terminal main body 50, and is connected to a controller 81 of a control device 80 (see FIG. 11 or FIG. 12).

Two types of sensors are mounted to the electric actuator 1. Those two types of sensors are held on the terminal part D. As illustrated in, for example, FIG. 1, one of the two types of sensors is a rotation angle detection sensor 53 for use in rotation control of the motor 25, and another is a stroke detection sensor 55 for use in stroke control (detection of the amount of displacement in the axial direction from the original point) of the ball screw shaft 33. For each of the rotation angle detection sensor 53 and the stroke detection sensor 55, there is used a Hall sensor being one type of magnetic sensors.

As illustrated in FIG. 1 and FIG. 8, the rotation angle detection sensor 53 is mounted to the print board 52, and is arranged so as to be opposed to a pulser ring 54, which is mounted to an end portion of the rotor inner 26 on the another side in the axial direction, through an axial gap. The rotation angle detection sensor 53 is configured to determine timings of causing an electric current to flow through the U-phase, the V-phase, and the W-phase of the motor 25.

As illustrated in FIG. 2, FIG. 7, and FIG. 8, the stroke detection sensor 55 is mounted to a band-shaped print board 56. The print board 56 extends in the axial direction, and an end portion thereof on the another side in the axial direction is connected to the print board 52. The print board 56 and the stroke detection sensor 55 are arranged in an inner periphery of the hole portion 33b of the ball screw shaft 33, specifically, on an inner periphery of the cylinder portion 36c of the spring mounting collar 36 received in the hole portion 33b. Moreover, on the inner periphery of the cylinder portion 36c of the spring mounting collar 36, permanent magnets 57 being targets are mounted so as to be opposed to the stroke detection sensor 55 through a radial gap. In this embodiment, the permanent magnets 57 are provided at two positions apart from each other in the axial direction. The stroke detection sensor 55 formed of the Hall sensor detects a magnetic field in the axial direction and a magnetic field in the radial direction which are formed around the permanent magnets 57, and calculates the amount of displacement of the ball screw shaft 33 in the axial direction based on the detection of the magnetic fields.

Figure 11:
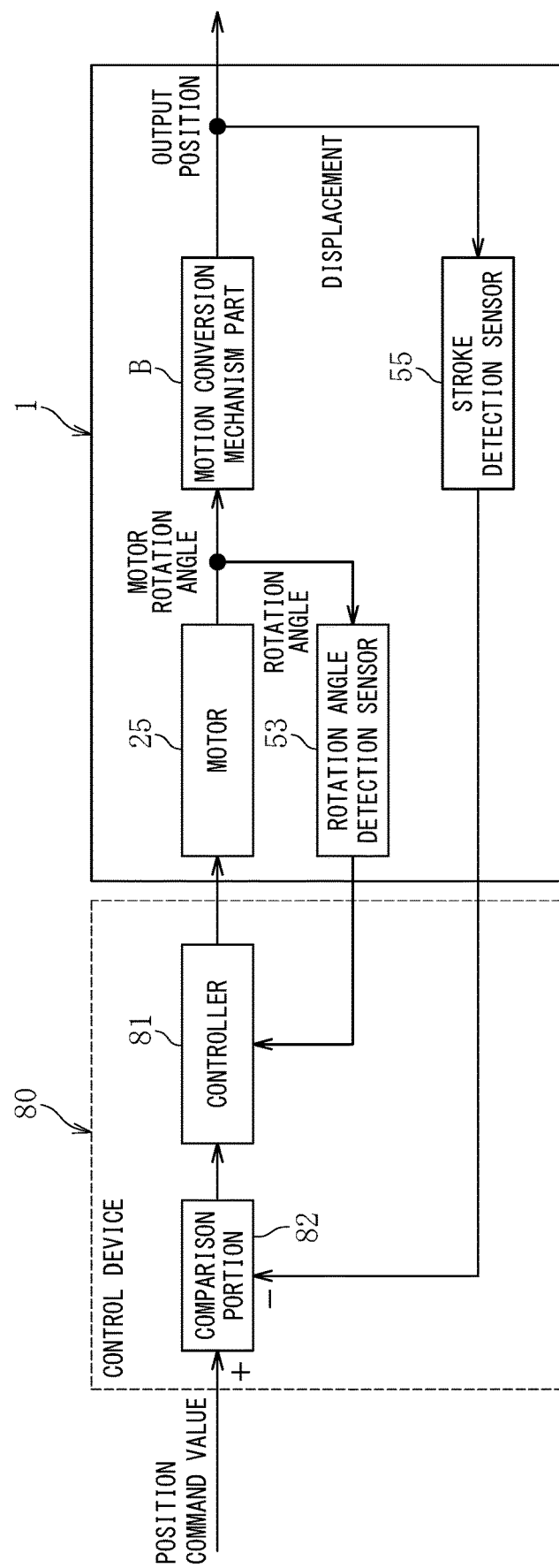
FIG. 11 is a schematic block diagram for illustrating a control system for the electric actuator of FIG. 1.
Figure 12:
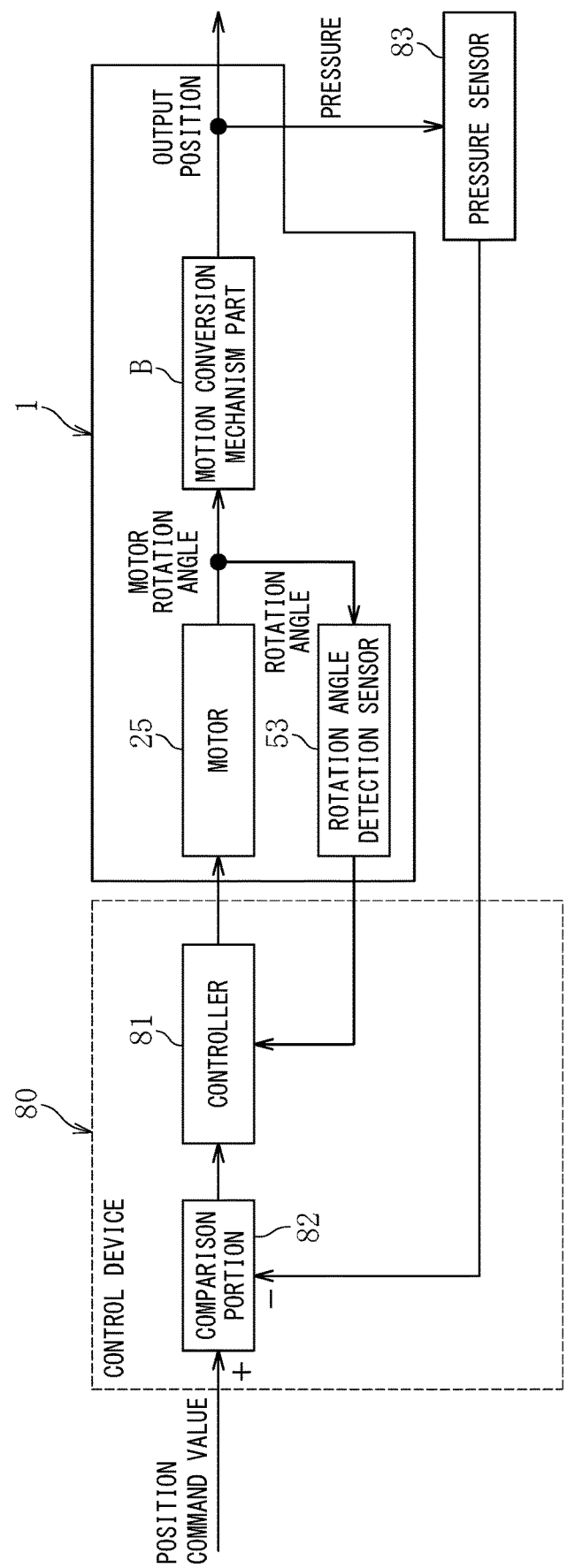
FIG. 12 is a block diagram for illustrating a control system for an electric actuator according to another embodiment of the present invention.

Although detailed illustration is omitted, a signal line of the rotation angle detection sensor 53 and a signal line of the stroke detection sensor 55 are each drawn out to the radially outer side of the housing 2 through the opening portion 50c (see FIG. 1) of the terminal main body 50 and connected to the control device 80 (see FIG. 11 or FIG. 12).

Figure 5:
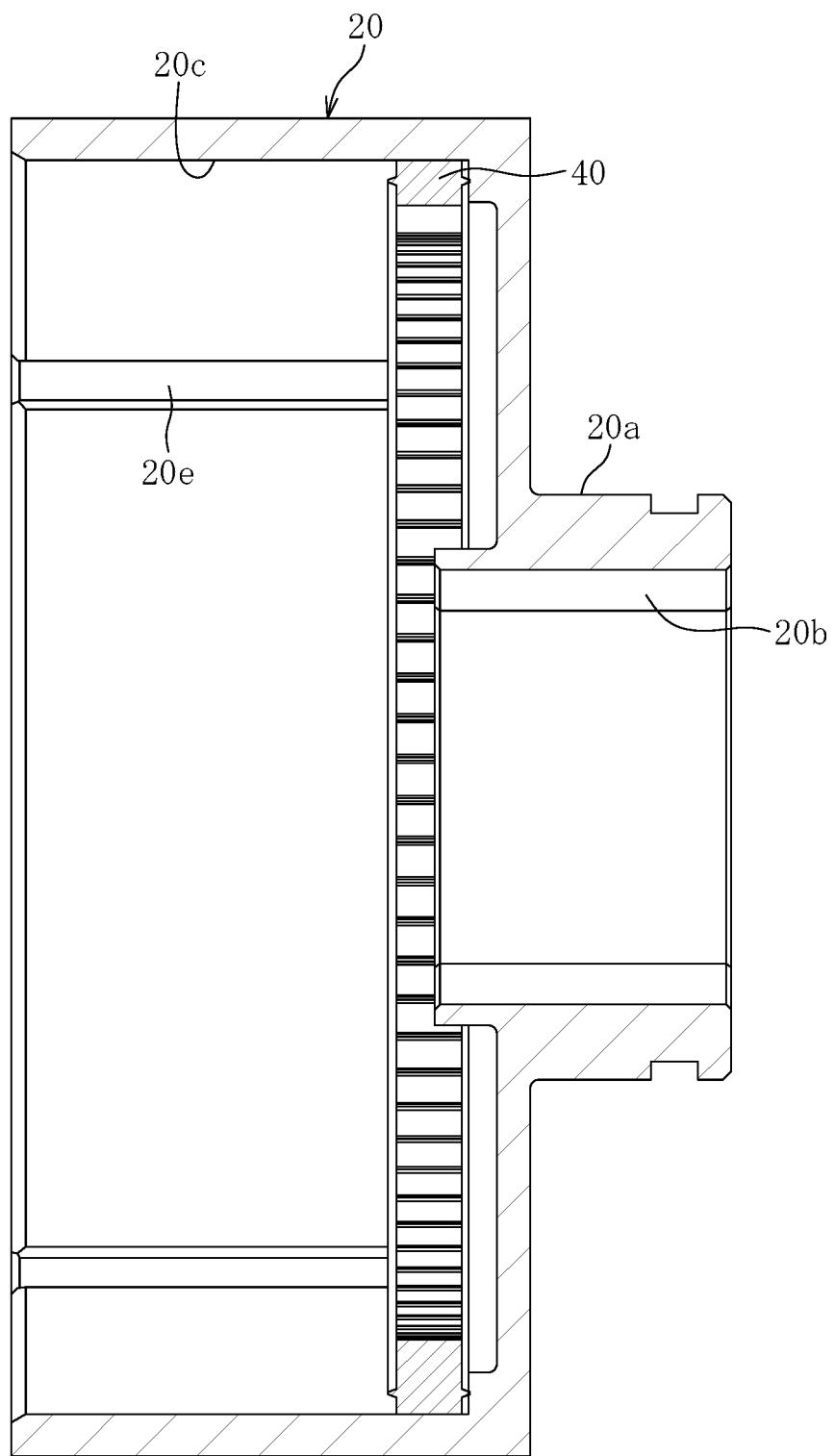
FIG. 5 is a vertical sectional view for illustrating a state in which a ring gear is assembled to a casing.

A procedure of assembling the electric actuator 1 having the above-mentioned configuration is briefly described. First, as illustrated in FIG. 5, the ring gear 40 is assembled to the casing 20. Next, a subassembly comprising the rotor 24 of the motor 25 and the motion conversion mechanism part B illustrated in FIG. 3 is inserted into the casing 20. At this time, the planetary gears 42 are brought into mesh with the ring gear 40, and the guide collars 38 are fitted to the guide grooves 20b of the casing 20. Further, the bearing holder 28 is fitted to the inner peripheral surface 20c of the casing 20. After that, of the subassembly comprising the stator 23 of the motor 25 and the terminal part D (terminal main body 50) illustrated in FIG. 6, the stator 23 is fitted to the inner periphery of the casing 20, and then the cover 29 and the terminal main body 50 are fastened to the casing 20 by the assembly bolts 61 (see FIG. 9 and FIG. 10). In such a manner, the electric actuator 1 is brought into completion.

As described above, in the electric actuator 1 according to this embodiment, the needle roller bearing 47 serving as the thrust bearing is arranged adjacent to the ball screw nut 32 on the another side in the axial direction. With such a configuration, the thrust load which acts on the ball screw nut 32 along with the advance of the ball screw shaft 33 can be directly supported by the needle roller bearing 47. Thus, the moment load which acts on the ball screw device 31 (motion conversion mechanism part B) comprising the ball screw shaft 33 and the ball screw nut 32 as components as well as on the rotor 24 of the motor part A can be effectively suppressed. Therefore, a highly reliable electric actuator with excellent operation accuracy and durability life can be achieved.

Further, the needle roller bearing 47 is arranged within a range in the axial direction between the rolling bearings 27 and 30 configured to rotatably support the rotor 24 (rotor inner 26). Thus, the effect of suppressing the moment load is further enhanced. Therefore, the needle roller bearing 47 having a smaller size can be used. In particular, when the needle roller bearing 47 is arranged near a center portion in the axial direction between the rolling bearings 27 and 30 as in this embodiment, the effect of suppressing the moment load can be further enhanced. Therefore, downsizing of the needle roller bearing 47 can be further promoted. As a result, for example, the needle roller bearing 47 and the thrust receiving ring 46 having extremely small size can be employed. Accordingly, the axial dimension L (see FIG. 1) of the housing 2 of the electric actuator 1 can be reduced. That is, the electric actuator 1 can be reduced in size in the axial direction.

Moreover, the end portion of the rotor inner 26 being a hollow rotation shaft on the one side in the axial direction is rotatably supported by the end portion of the rolling bearing 27 arranged close to the end portion of the rotor core 24a on the one side in the axial direction, and the end portion of the rotor inner 26 on the another side in the axial direction is rotatably supported by the rolling bearing 30 arranged close to the end portion of the rotor core 24a on the another side in the axial direction. With such a structure, the rotor inner 26 can be reduced in size in the axial direction. In addition, in combination with the structure in which the rolling bearing 27 is arranged within an axial width of the ball screw nut 32, the electric actuator 1 can be further reduced in size in the axial direction.

Further, as long as the rotation of the rotor 24 is balanced, it is only required that the rolling bearings 27 and 30 configured to support the rotor inner 26 be capable of supporting a radial load as small as the own weight of the rotor 24. In this case, it is not required that the rotor inner 26 integrally having the inner raceway surface 27a of the rolling bearing 27 be made of a material having a high strength. A required strength can be secured even when the rotor inner 26 is made of, for example, an inexpensive soft steel material for which thermal treatment such as quenching and tempering is omitted. In particular, in this embodiment, the rotary motion of the motor 25 is transmitted to the ball screw nut 32 through the planetary gear speed reducer 10. Thus, the radial load is not generated. Moreover, the reaction force (thrust load) generated along with the linear motion of the ball screw shaft 33 is directly supported by the needle roller bearing 47. Thus, it is only required that the rolling bearing 27 have a function of positioning in the radial direction, and hence the above-mentioned material specification is sufficient for the rotor inner 26 integrally having the inner raceway surface 27a of the rolling bearing 27. With this configuration, the electric actuator 1 can be reduced in cost.

Moreover, the cylindrical portion 43a of the planetary gear carrier 43 serves as an output portion of the planetary gear speed reducer 10, and the cylindrical portion 43a is press-fitted to the outer peripheral surface 32b of the ball screw nut 32 to couple the planetary gear carrier 43 and the ball screw nut 32 to each other so that torque can be transmitted. Thus, ease of coupling operation at the time of assembly is excellent, and stable torque transmission can be performed with respect to high torque after reduction in speed.

Moreover, with a combination of downsizing of the motor part A (motor 25) by providing the planetary gear speed reducer 10 to the motion conversion mechanism part B and the structure in which the rotor inner 26, the cylindrical portion 43a of the planetary gear carrier 43, and the ball screw nut 32 overlap in the radial direction, a radial dimension M (see FIG. 1) of the housing 2 of the electric actuator 1 can also be reduced. With this configuration, the electric actuator 1 can be further reduced in size, and mountability with respect to a device to be used is further improved.

Moreover, the rotor inner 26 and the sun gear 41 are coupled to each other through press-fitting of the sun gear 41 of the planetary gear speed reducer 10 to the inner peripheral surface of the rotor inner 26 so that torque can be transmitted. Also in this point, the ease of coupling operation at the time of assembly is excellent. Even when such a coupling structure is employed, the sun gear 41 is only required to rotate together with the rotor inner 26 before reduction in speed, and hence the torque transmission performance required between the sun gear 41 and the rotor inner 26 can be sufficiently secured. Further, the rotor inner 26 and the sun gear 41 are coupled to each other at a position directly below the rolling bearing 27 configured to support the rotor inner 26. Thus, the rotation accuracy of the sun gear 41 is also excellent.

Further, the rotor inner 26 and the ball screw nut 32 are formed as separate members. Thus, for example, even when the ball screw device 31 having a different specification is employed, the rotor inner 26, as well as the motor part A, can be standardized. With this, versatility can be improved, and series production of various types of the electric actuator 1 with standardized components can easily be achieved.

Further, there is employed a sandwich structure of holding, for example, the power supply circuit, the rotation angle detection sensor 53, and the stroke detection sensor 55 with the terminal main body 50 and sandwiching the terminal main body 50 (terminal part D) between the casing 20 and the cover 29 in the axial direction. Therefore, the ease of assembly is excellent. Further, with the sandwich structure described above and the structure in which the lead line of the power supply circuit and the signal line of the sensor can be drawn out to the radially outer side of the housing 2, there can be achieved an electric actuator comprising a plurality of electric actuators 1 (units each comprising the motor part A, the motion conversion mechanism part B, and the terminal part D formed into a unit) arrayed in the axial direction and being capable of individually operating a plurality of objects to be operated.

The electric actuator 1 according to this embodiment has the features described above. Thus, the electric actuator 1 is highly reliable with excellent operation accuracy and durability life, is reduced in weight and size with excellent mountability with respect to a device to be used, and enables easy production in series at low cost.

Finally, with reference to FIG. 1 and FIG. 11, an operation mode of the electric actuator 1 of this embodiment is briefly described. Although illustration is omitted, for example, when an operation amount is input to an ECU provided at an upper position of the vehicle, the ECU calculates a requested position command value based on the operation amount. As illustrated in FIG. 11, the position command value is transmitted to the controller 81 of the control device 80, and the controller 81 calculates a control signal of a motor rotation angle required in accordance with the position command value, and transmits the control signal to the motor 25.

The rotor 24 (rotor inner 26) rotates based on the control signal transmitted from the controller 81, and the rotary motion is transmitted to the motion conversion mechanism part B. Specifically, when the rotor 24 rotates, the sun gear 41 of the planetary gear speed reducer 10 coupled to the rotor inner 26 rotates. Along with this rotation, the planetary gears 42 revolve, and the planetary gear carrier 43 rotates. With this, the rotary motion of the rotor 24 is transmitted to the ball screw nut 32 coupled to the planetary gear carrier 43. At this time, the revolving motion of the planetary gears 42 reduces the rotation number of the rotor 24, thereby increasing rotation torque transmitted to the ball screw nut 32.

When the ball screw nut 32 rotates upon receiving the rotary motion of the rotor 24, the ball screw shaft 33 advances while being stopped in rotation. At this time, the ball screw shaft 33 advances to a position based on the control signal of the controller 81, and the actuator head 39 fixed to the end portion of the ball screw shaft 33 on the one side in the axial direction operates (adds pressure to) an object to be operated (not shown).

An axial position (amount of displacement in the axial direction) of the ball screw shaft 33 is detected by the stroke detection sensor 55 as illustrated in FIG. 11, and a detection signal thereof is transmitted to a comparison portion 82 of the control device 80. Then, the comparison portion 82 calculates a difference between a detection value detected by the stroke detection sensor 55 and a position command value, and the controller 81 transmits a control signal to the motor 25 based on the detection value and the signal transmitted from the rotation angle detection sensor 53. In such a manner, a position of the actuator head 39 is subjected to feed back control. Therefore, when the electric actuator 1 of this embodiment is applied to, for example, a shift-by-wire system, a shift position can be reliably controlled. The power for driving the motor 25 and the sensors 53 and 55 is supplied from an external power supply (not shown) such as a battery provided on the vehicle side to the motor 25 through the control device 80 and the power supply circuit held by the terminal portion D.

In the above, description is made of the electric actuator 1 according to one embodiment of the present invention. However, the present invention is not limited to the embodiment described above.

For example, as the thrust bearing to be arranged adjacent to the ball screw nut 32 on another side in the axial direction, a rolling bearing other than the needle roller bearing 47, for example, a cylindrical roller bearing can be employed. However, in consideration of ability to support the thrust load and the axial dimension of the bearing, the needle roller bearing 47 is preferred.

Further, for example, in the embodiment described above, the hole portion 33b (through hole in the axial direction) opened in both end surfaces of the ball screw shaft 33 in the axial direction is formed so that the ball screw shaft 33 has a hollow shape, and the stroke detection sensor 55 is arranged on the inner periphery of the ball screw shaft 33. However, by forming a hole portion 33b which is opened only in the end surface on another side in the axial direction and extends in the axial direction in the ball screw shaft 33, the ball screw shaft 33 may be formed so as to have a hollow shape.

Moreover, in the embodiment described above, the compression coil spring 48 serving as an urging member configured to always urge the ball screw shaft 33 to the original point side is provided. However, it is only required that the compression coil spring 48 be provided depending on the use which requires the urging function, and the compression coil spring 48 may be omitted when it is not required.

Moreover, as a speed reducer forming the motion conversion mechanism part B, a speed reducer other than the planetary gear speed reducer 10 may be employed. Moreover, the present invention is applicable not only to the electric actuator 1 comprising the speed reducer but also to the electric actuator 1 not comprising the speed reducer. Although illustration is omitted, when the speed reducer is omitted, it is only required that the ball screw nut 32 and the rotor inner 26 be directly coupled to each other so that torque can be transmitted.

In the embodiment described above, the stroke detection sensor 55 is used. However, depending on a device to be used, there is also a case in which the stroke detection sensor 55 is not used.

With reference to FIG. 12, description is made of an example operation mode of the electric actuator 1 in a case in which the stroke detection sensor 55 is not used. FIG. 12 is an example of pressure control, and a pressure sensor 83 is provided to an object to be operated (not shown). When an operation amount is input to an ECU (not shown), the ECU calculates a requested pressure command value. When the pressure command value is transmitted to the controller 81 of the control device 80, the controller 81 calculates a control signal of a motor rotation angle required in accordance with the pressure command value, and transmits the control signal to the motor 25. Then, similarly to the case described with reference to FIG. 11, the ball screw shaft 33 advances to a position based on the control signal of the controller 81, and the actuator head 39 fixed to an end portion of the ball screw shaft 33 on one side in the axial direction operates an object to be operated (not shown).

An operation pressure of the ball screw shaft 33 (actuator head 39) is detected by a pressure sensor 83 installed outside, and is subjected to feedback control. Therefore, when the electric actuator 1 which does not involve use of the stroke detection sensor 55 is applied to, for example, a brake-by-wire system, the liquid pressure of the brake can be reliably controlled.

The present invention is not limited to the above-mentioned embodiment. As a matter of course, the present invention may be carried out in various modes without departing from the spirit of the present invention. The scope of the present invention is defined in claims, and encompasses equivalents described in claims and all changes within the scope of claims.

REFERENCE SIGNS LIST 1 electric actuator
2 housing
10 planetary gear speed reducer (speed reducer)
20 casing
24 rotor
25 motor
26 rotor inner (hollow rotation shaft)
29 cover
31 ball screw device
32 ball screw nut
33 ball screw shaft
34 ball
40 ring gear
41 sun gear
42 planetary gear
43 planetary gear carrier
47 needle roller bearing (thrust bearing)
48 compression coil spring (urging member)
50 terminal main body
50c opening portion
A motor part
B motion conversion mechanism part
C operation part
D terminal part
L axial dimension of housing
M radial dimension of housing

The invention claimed is:

1. An electric actuator, comprising:
a motor part configured to drive upon receiving supply of power; and
a motion conversion mechanism part configured to convert a rotary motion of the motor part into a linear motion to output the linear motion,
wherein the motion conversion mechanism part comprises:
a ball screw shaft arranged coaxially with a rotation center of the motor part; and
a ball screw nut, which is rotatably fitted to an outer periphery of the ball screw shaft through intermediation of a plurality of balls, and is provided so as to be capable of transmitting torque with a rotor of the motor part rotatably supported through intermediation of two rolling bearings,
wherein the ball screw shaft advances toward one side in an axial direction or retreats toward another side in the axial direction in accordance with a rotation direction of the ball screw nut,
wherein a thrust bearing is arranged adjacent to the ball screw nut on the another side in the axial direction,
wherein the two rolling bearings are arranged at locations apart from each other in the axial direction,
wherein the thrust bearing is arranged within a range in the axial direction between the two rolling bearings,
wherein one of the two rolling bearings supports one end portion in the axial direction of the rotor, and is arranged close to an end portion of a rotor core of the rotor on the one side in the axial direction, and
wherein another of the two rolling bearings supports another end portion in the axial direction of the rotor, and is arranged close to an end portion of the rotor core of the rotor on the another side in the axial direction.

2. The electric actuator according to claim 1, wherein the thrust bearing comprises a needle roller bearing.

3. The electric actuator according to claim 1,
wherein the rotor of the motor part comprises:
the rotor core which holds a rotor magnet; and
a hollow rotary shaft, which has the rotor core mounted to an outer periphery thereof, and has the ball screw nut arranged at an inner periphery thereof, and
wherein an inner raceway surface of one of the two rolling bearings is formed on the hollow rotary shaft.

4. The electric actuator according to claim 3, wherein the inner raceway surface is arranged within an axial width of the ball screw nut.

5. The electric actuator according to claim 1, further comprising an urging member configured to always urge the ball screw shaft toward the another side in the axial direction.

6. The electric actuator according to claim 1, wherein the motion conversion mechanism part further comprises a speed reducer configured to reduce a speed of rotation of the rotor and transmit the rotation to the ball screw nut.

7. The electric actuator according to claim 6, wherein the speed reducer comprises a planetary gear speed reducer.

8. The electric actuator according to claim 1, further comprising:
a housing, which comprises a plurality of members being coupled to one another in the axial direction, and is configured to accommodate the motor part and the motion conversion mechanism part; and
a terminal part which is configured to hold a power supply circuit, the power supply circuit being configured to supply the power to the motor part,
wherein the terminal part is sandwiched by the members forming the housing from both sides in the axial direction.

9. The electric actuator according to claim 8, wherein the terminal part has, on an outer peripheral portion thereof, an opening portion for allowing a lead wire connected to the power supply circuit to be drawn out to a radially outer side of the housing.

* * * * *